United States Patent
Wedel

[15] 3,677,575
[45] July 18, 1972

[54] APPARATUS FOR TEMPORARILY CLOSING A PIPELINE

[72] Inventor: Alfred W. Wedel, Houston, Tex.
[73] Assignee: Cameron Iron Works, Inc., Houston, Tex.
[22] Filed: Aug. 3, 1970
[21] Appl. No.: 46,491

[52] U.S. Cl....................................285/3, 137/68, 285/423
[51] Int. Cl.........................................................F16l 35/00
[58] Field of Search...................285/3, 4, 229, DIG. 11, 370, 285/423; 138/89, 90; 137/68, 797; 220/89 A; 277/235 R; 166/191, 192, 196, 202

[56] References Cited

UNITED STATES PATENTS

| | | | |
|---|---|---|---|
| 3,064,854 | 11/1962 | Miller | 220/89 A |
| 3,039,482 | 6/1962 | Goldberg | 220/89 A |
| 3,114,395 | 12/1963 | Immel | 285/37 UX |
| 2,178,686 | 11/1939 | Georgiev et al. | 220/89 A |

Primary Examiner—Dave W. Arola
Attorney—Hyer, Eickenroht, Thompson & Turner

[57] ABSTRACT

There is disclosed a body having an outer elastic surface of a diameter which fits closely within a pipe, and a shearable flange about the body which is tightly engaged in a groove within the pipe to temporarily retain the body in position to close the pipe.

10 Claims, 6 Drawing Figures

Alfred W. Wedel
INVENTOR.

BY Dyer, Eickenroht,
Thompson & Turner
ATTORNEYS

Patented July 18, 1972

Alfred W. Wedel
INVENTOR

BY Hyer, Eickenroht,
Thompson & Turner
ATTORNEYS

Alfred W. Wedel
INVENTOR.

BY Hyer, Eckenrodt,
Thompson + Turner
ATTORNEYS

APPARATUS FOR TEMPORARILY CLOSING A PIPELINE

This invention relates generally to apparatus for temporarily closing a pipeline. More particularly, it relates to improvements in apparatus of this type which include a closure adapted to be released from pipeline closing position by the application within the pipeline of a predetermined fluid pressure differential across the closure.

Apparatus of this type is useful, for example, in the installation and repair of underwater pipelines, wherein it may be necessary to close one or more ends of the sections of the pipeline to be installed or repaired. Thus, in such a case, it may be necessary to exclude sea water from the pipeline sections and/or prevent pollution of the sea water by materials within such sections. However, upon installation or repair, it is necessary to prepare the pipeline for normal flow by removing the temporary closure.

The prior art has sought alternatives to the use of valves for this purpose, not only because of the expense involved, but also because of the complications in operating valves at underwater or other remote locations. One such prior art suggestion has been the use of frangible discs held about their peripheries in the pipeline. Although these discs may be ruptured with relative ease by the application within the pipeline of fluid pressure differential across them, they form "trash" within the pipeline which is difficult and expensive to remove.

In accordance with another prior art suggestion, a ball of elastic material is fitted tightly within the pipeline so as to be temporarily retained therein by frictional engagement with the pipeline. Although these closures are easily removed from the pipeline inasmuch as they merely move as a whole through the line in response to the pressure differential, it is very difficult to predetermine with any degree of accuracy the force required to release them from frictional engagement with the pipeline. Also, in order to avoid frictional engagement between the remainder of the pipeline and the ball which would interfere with the removal of the sphere upon release of the ball, it has sometimes been necessary to provide an undesirably restricted area in the pipeline for receiving the sphere in its temporary closing position.

An object of this invention is to provide apparatus of this type which obviates the aforementioned difficulties of the prior art.

A more specific object is to provide such apparatus in which the temporary closure member is of such construction as to permit it to be removed from the pipeline without leaving trash, and at the same time to enable the operator to predetermine the force at which it will be released from its temporary closing position.

A further object is to provide such apparatus which is of inexpensive and relatively simple construction, and which may be installed with ease in the pipeline.

These and other objects are accomplished, in accordance with the illustrated embodiments of the present invention, by apparatus which comprises a pipe for connection into the pipeline and having a groove therein where the pipe is to be temporarily closed, and a temporary closure for the pipe which includes a body having an outer elastic surface of a diameter for fitting closely within the pipe and a flange about the body adapted to be tightly engaged in the groove so as to retain the body in pipeline position. More particularly, the body is adapted to be sheared from the flange upon the application within the pipeline of a predetermined fluid pressure differential across the body, and the body is of sufficient extent in a direction longitudinally of the pipeline, i.e., transverse to the flange, to maintain its outer surface in close fitting relation within the pipe, so that, when it is sheared from the flange, fluid pressure differential will continue to act across it to cause the body to move through the pipe to a suitable place for removal.

In one embodiment of the invention, the body is a ball of elastic material, and in other embodiments of the invention, the body is of cylindrical shape. In the latter embodiments, the cylindrical body itself may be of an elastic material, or of any material having a cup of elastic material disposed about it for sealably engaging the pipe.

Preferably, there is a rigid insert in the flange of each embodiment having an inner diameter which lies substantially adjacent the intersection of the flange with the body. This insures that the flange will not be pulled from the groove, and further that the body will shear cleanly from the flange. The flange may be integral with the body, in which case it will be formed of an elastic material when the body itself is of elastic material. Alternatively, the flange may be separate from and secured to the body in any suitable part.

In the drawings, wherein like reference characters are used throughout to designate like parts:

Figure 1:
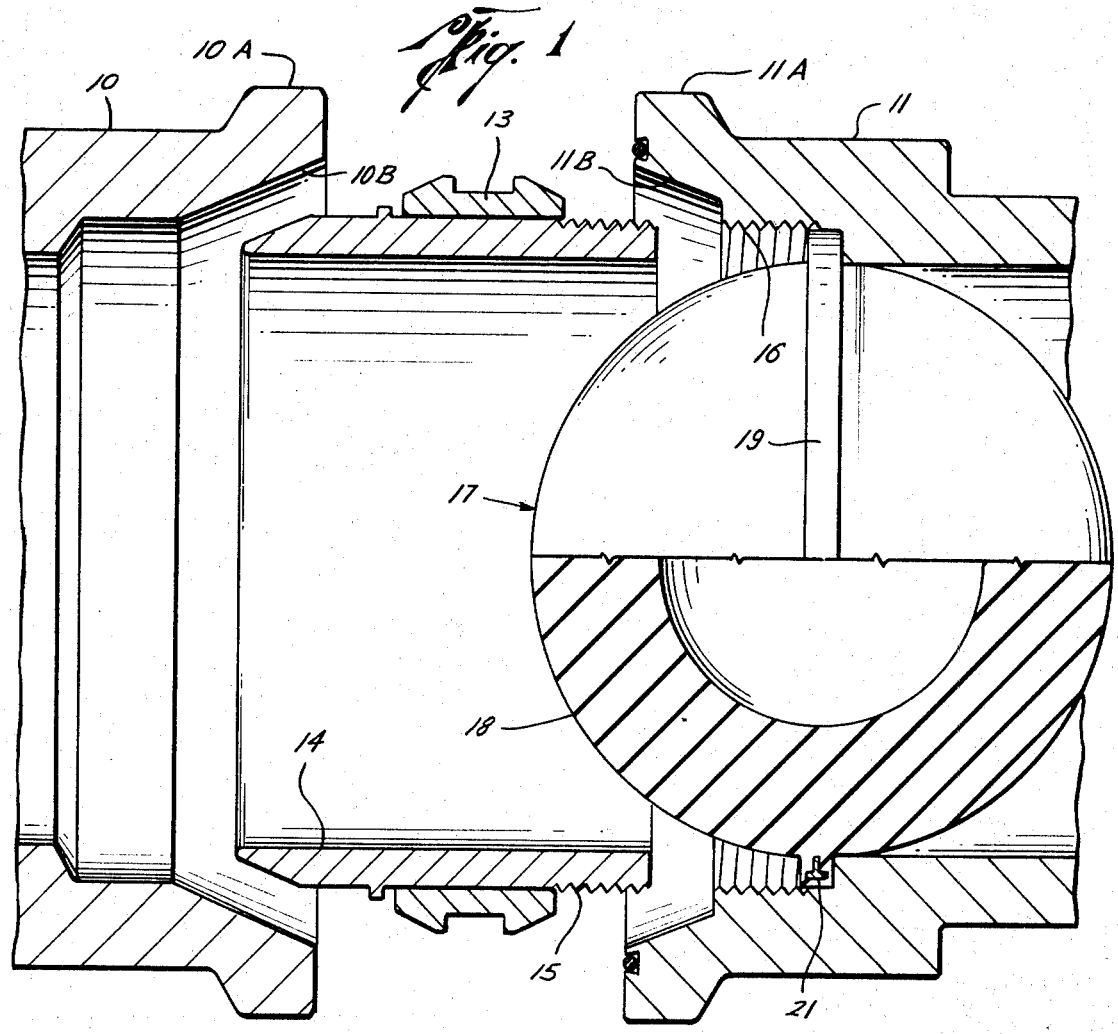
FIG. 1 is a longitudinal sectional view of one embodiment of a closure constructed in accordance with this invention, and shown during its installation within a pipeline.
Figure 2A:
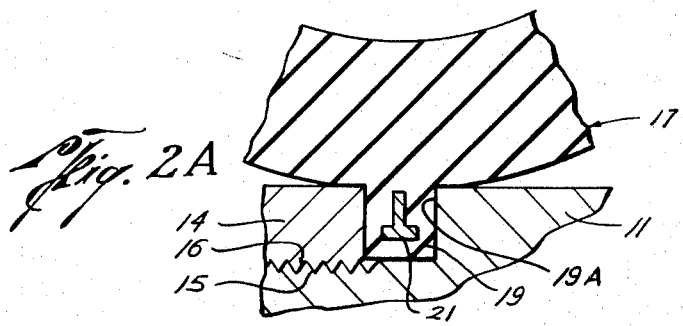
FIG. 2A is an enlarged detailed view of the flange of the closure member of FIG. 2 held tightly within a groove in the pipeline.
Figure 2:
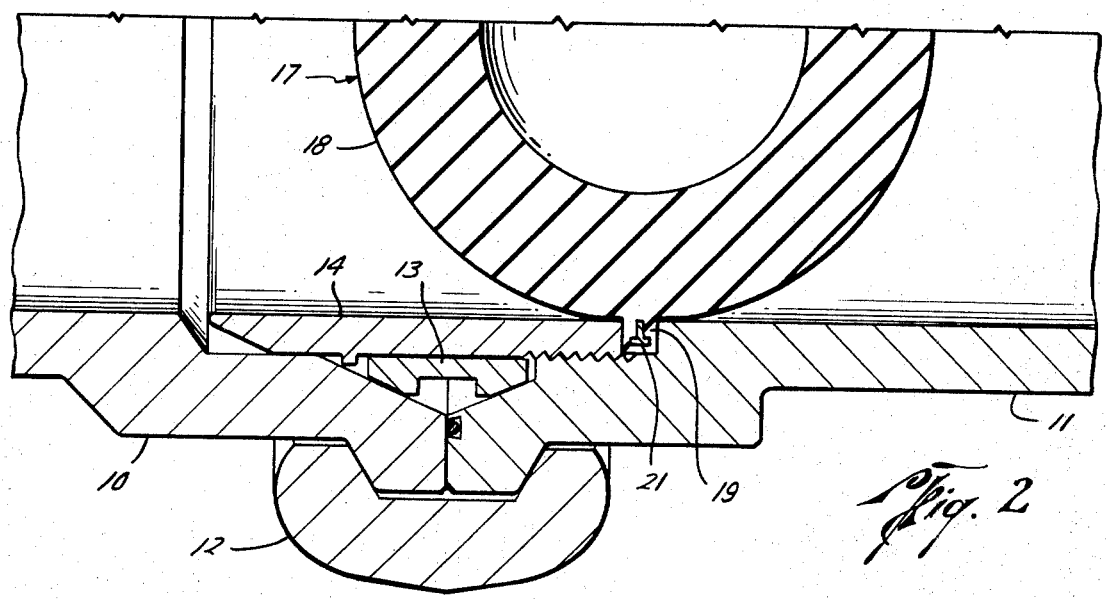
FIG. 2 is a view similar to FIG. 1, but with the temporary closure installed within the pipeline.
Figure 3:
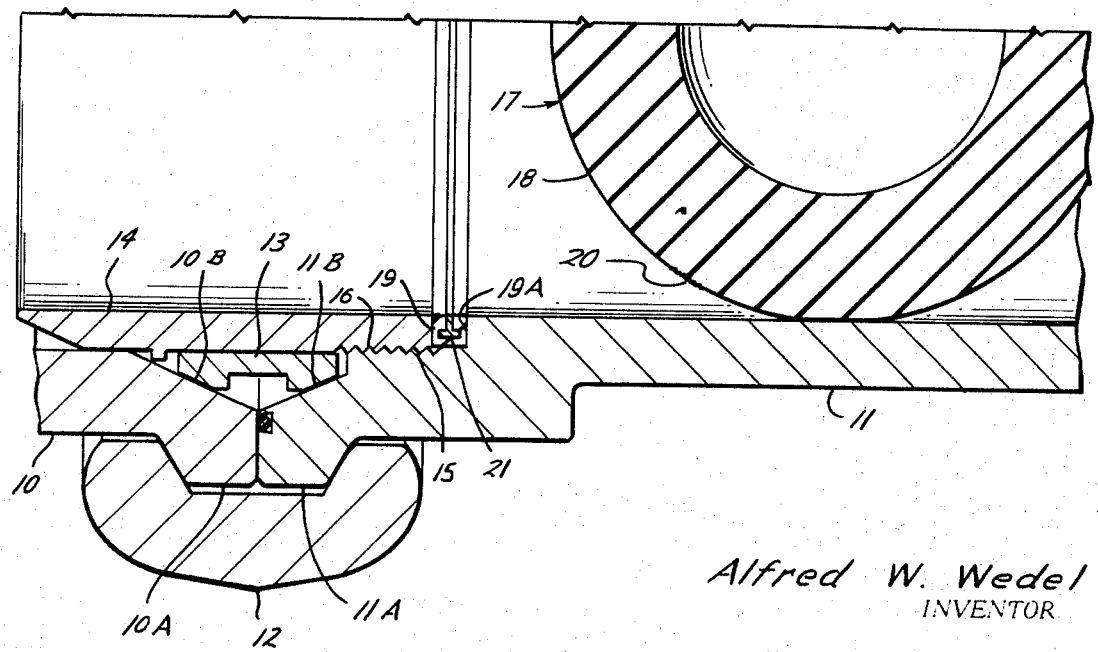
FIG. 3 is a view similar to FIGS. 1 and 2, but upon shearing of the body of the temporary closure from its flange.

With reference now to the above-described drawings, the pipeline shown in connection with the first embodiment is shown in FIGS. 1 to 3 to be made up of pipes 10 and 11 having hubs 10A and 11A on their adjacent ends and a coupling 12 for connecting the pipes together in axial alignment. The inner surfaces 10B and 11B of the hubs are tapered to form a recess to receive a seal ring 13 between them when the hubs are connected by coupling 12. The seal ring is carried by a sleeve 14 having an inner diameter forming a continuation of the inner diameters of the pipes 10 and 11 and of a length for spanning the recess. More particularly, one end of the sleeve 14 is threaded at 15 for connection with threads 16 and a counterbore in the end of pipe 11. During assembly, the sleeve is made up with pipe 11, as described below, and the pipe 10 is then connected to the sleeve by the coupling 12.

The temporary closure of this embodiment, which closure is designated in its entirety by reference character 17, comprises a ball 18 of elastic material such as rubber having an outer diameter somewhat larger than the inner diameter of the pipeline for fitting closely therein. As shown in the drawings, the ball is preferably hollow to permit it to be inflated with a gas at a suitable pressure, and when it is so inflated, its outer diameter becomes cylindrical along its engagement with the inner diameter of the pipe, and in any case sealably engaged with the pipe. Even though ball 18 rotates within the pipe, it will remain of sufficient extent longitudinally of the pipe to maintain such engagement as it is moved longitudinally within the pipe in response to fluid pressure differential across it.

The temporary closure 17 also includes a flange 19 about the ball 18 which is tightly engaged within a groove 19A within the pipe, as best shown in FIGS. 2 and 2A. This groove is formed between the oppositely facing ends of the counterbore within the pipe 11 and sleeve 14 when the sleeve is threadedly connected to the pipe, the pipe and sleeve forming sections of pipe which are connected in the pipeline.

Thus, as will be apparent from FIG. 1, in the assembly of apparatus of FIGS. 1 to 3, the flange 19 is moved through the open end of the pipe 11 and into a position against the end of the counterbore therein, as shown in FIG. 1. The sleeve 14 carrying the ring 13 is then threadedly made up with the pipe 11 so as to move its end against the side of the flange 19 until the latter is tightly engaged within the groove 19A.

As shown in the drawings, the flange is integral with the ball 18 and thus also of rubber or other suitable elastic material, and extends radially outwardly to a position close to the counterbore in the pipe 11. Furthermore, the flange is relatively thin so that, as will be described below, the body may be sheared from it without the necessity for excessive pressures within the pipeline.

With the closure member 17 thus installed in the pipeline, fluid at a desired pressure may be pumped into the pipeline on either side of the ball 18 so as to form a pressure differential thereacross of desired extent. Upon the imposition of this differential, the ball thereof is caused to shear from the flange which is tightly engaged within the groove, and since it fits tightly within the pipeline, it maintains sealing engagement with the inner diameter of the pipeline when so sheared and is caused to move by pressure differential longitudinally within the pipe. Consequently, as illustrated in FIG. 3, a predominant pressure on the left side of the ball has caused it to shear from the flange and move longitudinally within the pipe from left to right. As in well known pipeline "pig" operations, the ball 18 may be removed from the pipeline at a suitable downstream location.

Preferably, a rigid insert 21 is embedded within and molded to the flange with its inner diameter lying substantially along the intersection of the flange and ball. This has been found to insure against the flange being pulled from the groove in response to the pressure differential thereacross and to cause the body to shear cleanly from the flange, as indicated at 20 in FIG. 3. As shown in the drawings, the insert is of a "T" shape so as to increase the bond area between it and the rubber of the flange.

Figure 4:
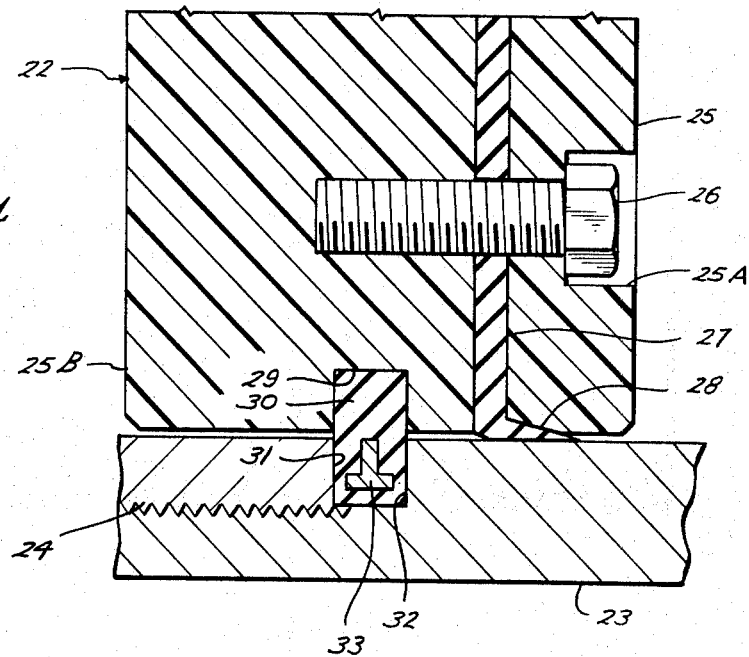
FIG. 4 is a longitudinal sectional view of an alternative embodiment of the temporary closure installed within a pipeline.

The closure shown in FIG. 4 and indicated in its entirety by reference character 22, is temporarily retained within a pipe made up of pipe section 23 having a counterbore to receive pipe section 24 threadedly connected to it. Temporary closure 22 comprises a cylindrical body 25 having an outer diameter somewhat less than the inner diameter of the pipe in which the closure is disposed. More particularly, this body is made up of sections 25a and 25b connected together by bolts 26 or the like, and a cup-type packer 27 of elastic material held between the body sections. A lip 28 on the periphery of the packer forms an outer surface on the body 25 which fits closely within the pipeline to form a temporary closure across it, when the body is temporarily retained within the pipe, as will be described below.

The body section 25B of the temporary closure 22 has a groove 29 about its outer diameter in which a ring 30 is secured. The outer portion of the ring projects from the outer diameter of body 25 to form a flange 31 which is tightly engaged in groove 32 in the body defined between opposed walls on pipe sections 23 and 24. Flange 31 is made of shearable material calculated to rupture at the desired pressure differential.

The body 25 is of a sufficient length longitudinally of the pipeline to maintain the lip 28 about its cylindrical outer surface in sealing engagement with the pipeline upon its release from the closing position of FIG. 4. That is, as distinguished from the frangible discs of the prior art, the body 25 will not tilt out of close fitting relation within the pipeline. Due to the arrangement of packer 27, the pressure differential for shearing the body from the flange 31 is applied from right to left in the pipeline.

As in the temporary closure of FIGS. 1 to 3, a rigid insert 33 is embedded within the flange 31 and has an inner diameter lying substantially along the intersection of the flange with the body 25. Thus, upon the application of a predominant fluid pressure of predetermined extent to the right-hand side of body 25, it will be caused to shear from the flange 31 along a clean line of separation, and then, move from right to left through the pipe for removal at a suitable location in the pipeline.

Figure 5:
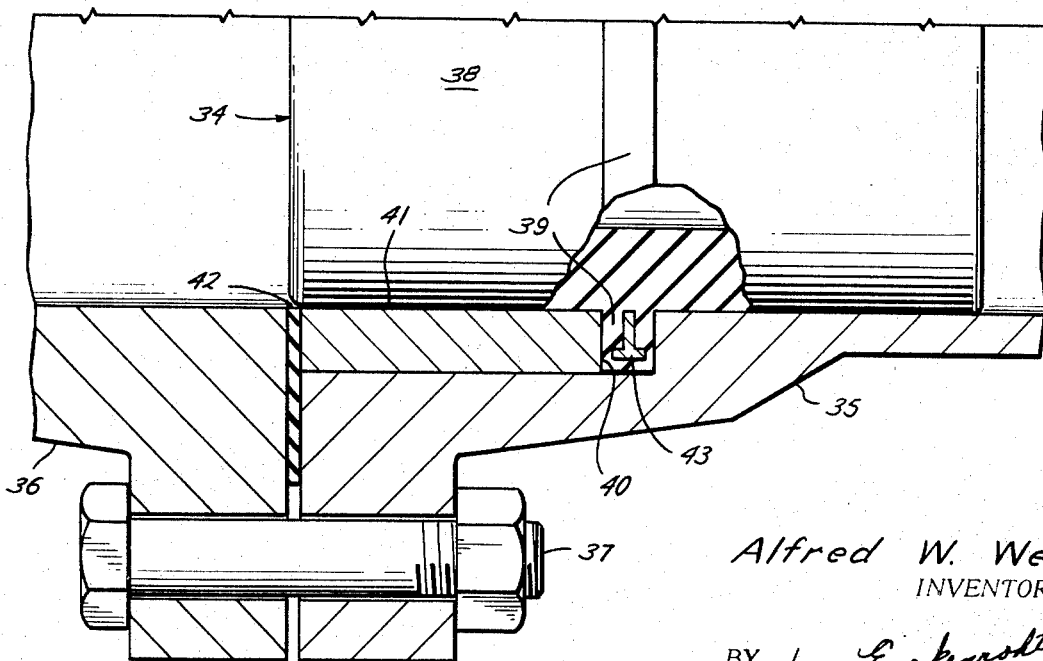
FIG. 5 is a view, partly in section, of a still further alternative embodiment of the temporary closure installed within a pipeline.

The embodiment of the temporary closure shown in FIG. 5, which is indicated in its entirety by reference character 34, is temporarily retained in a pipeline made up of pipe sections 35 and 36 connected together by bolts 37 extending through adjacent flanges on the pipes. This member includes a cylindrical body 38 of rubber or other elastic material having an outer diameter for fitting closely within the inner diameter of the pipeline, and a flange 39 thereabout tightly engaged in a groove 40 formed in the pipeline between the opposed ends of pipe section 35 and a sleeve 41 received in a counterbore within such section, and engaging at its other end a gasket between the ends of the pipe sections. As in the case of the ball 18 for the closure 17, the cylindrical body 38 may also be hollow to permit it to be inflated to the desired outer diameter.

As in the case of the body 25 of closure 22, the body 38 is of substantial longitudinal extent so as to maintain it in close fitting relation within the pipe, both while it is temporarily retained in the pipe as well as when it shears from the flange 39 and moves longitudinally within the pipe. The flange is shown to be integral with the body and thus of rubber or other elastic material.

Similarly to the previously described embodiments, a rigid insert 43 is embedded within the flange 39 with its inner diameter lying substantially along the inner section of the flange body. Thus, the body will be caused to shear cleanly from the flange in response to a predetermined pressure differential across it.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A temporary pipe closure, comprising a body having an outer rubber-like surface of a diameter for fitting closely within a pipe, and a flange about the body adapted to be tightly engaged in a groove within the pipe so as to temporarily retain said body in position to close the pipe until it is sheared from said flange in response to fluid pressure differential across said body, said body being of sufficient extent in a direction transverse to the flange to maintain its outer surface in close fitting relation within the pipe, so that upon shearing from said flange, said body will be moved through the pipe by the fluid pressure differential across it for removal at a suitable place remote from said groove.

2. A temporary pipe closure of the character defined in claim 1, wherein said flange is made of rubber-like material and has a rigid insert therein whose inner diameter lies substantially adjacent the intersection of the flange with the body.

3. A temporary pipe closure of the character defined in claim 1, wherein the body is substantially spherical.

4. A temporary pipe closure of the character defined in claim 1, wherein the body is substantially cylindrical.

5. A temporary pipe closure of the character defined in claim 1, wherein the body is of rubber-like material.

6. A temporary pipe closure of the character defined in claim 1, wherein said outer rubber-like surface is a sealing element about the body.

7. A temporary pipe closure of the character defined in claim 6, wherein the sealing element is a cup-shaped packer.

8. A temporary pipe closure of the character defined in claim 1, wherein the flange is integral with the body.

9. Apparatus for installation in a pipeline for temporarily closing same, comprising a pipe for connection to said pipeline and having a circumferential groove therein, the inside diameter of said pipe being substantially equal to that of the pipeline, and a temporary closure for the pipe including a body having an outer rubber-like surface of a diameter for fitting closely within the pipe, and a flange about the body tightly received in the groove so as to retain said body in a position to close the pipe until it is sheared from said flange in response to fluid pressure differential thereacross, said body being of sufficient extent in a direction longitudinally of the pipeline to maintain its outer surface in close fitting relation within the pipe and pipeline, so that upon shearing of said body from said flange, the fluid pressure differential across the body is effective to move it in sealing engagement through the pipe and pipeline for removal at a suitable place remote from the pipe.

10. Apparatus of the character defined in claim 9, wherein the pipe includes a first pipe section having an end wall defining one side of the groove, a second pipe section having an end wall defining the opposite side of the groove, and means for connecting the pipe sections so as to tightly engage said flange between said walls.

* * * * *